US009648495B2

United States Patent
Nozulak et al.

(10) Patent No.: US 9,648,495 B2
(45) Date of Patent: May 9, 2017

(54) METHOD AND DEVICE FOR TRANSMITTING A VERIFICATION REQUEST TO AN IDENTIFICATION MODULE

(71) Applicants: Thorsten Nozulak, Datteln (DE); Ulrich Seifert, Dusseldorf (DE)

(72) Inventors: Thorsten Nozulak, Datteln (DE); Ulrich Seifert, Dusseldorf (DE)

(73) Assignee: Vodafone Holding GmbH (DE)

(*) Notice: Subject to any disclaimer, the term of this patent is extended or adjusted under 35 U.S.C. 154(b) by 109 days.

(21) Appl. No.: 13/921,323

(22) Filed: Jun. 19, 2013

(65) Prior Publication Data
US 2013/0337773 A1 Dec. 19, 2013

(30) Foreign Application Priority Data
Jun. 19, 2012 (DE) .................. 10 2012 210 343

(51) Int. Cl.
*H04M 1/66* (2006.01)
*H04W 12/06* (2009.01)
*H04L 29/06* (2006.01)

(52) U.S. Cl.
CPC ......... *H04W 12/06* (2013.01); *H04L 63/0853* (2013.01); *H04L 63/18* (2013.01)

(58) Field of Classification Search
CPC ..... H04W 12/06; H04L 63/0853; H04L 63/18
USPC ..... 380/270, 247, 249, 255; 455/435.1, 558, 455/410, 411; 726/2, 4, 9, 16, 17, 20; 713/168, 169, 170, 171, 173
See application file for complete search history.

(56) References Cited

U.S. PATENT DOCUMENTS

| 2004/0131185 A1 | 7/2004 | Kakumer |
| 2007/0155362 A1* | 7/2007 | Davis .................. 455/404.1 |
| 2009/0065571 A1* | 3/2009 | Jain ....................... 235/379 |
| 2010/0272087 A1* | 10/2010 | Zhang et al. ............ 370/338 |
| 2012/0144189 A1* | 6/2012 | Zhong .................... 713/155 |
| 2012/0149330 A1* | 6/2012 | Watson et al. ........... 455/411 |
| 2012/0329521 A1* | 12/2012 | Jacobs et al. ............ 455/558 |

(Continued)

OTHER PUBLICATIONS

GSM and Personal Communications Handbook, Siegmund M. Redl, Matthias K. Weber & Malcolm W. Oliphant, Published by Artech House, Inc. Publishers 1998.

*Primary Examiner* — Kwasi Karikari
(74) *Attorney, Agent, or Firm* — Tarolli, Sundheim, Covell & Tummino LLP

(57) ABSTRACT

A method for transmitting a verification request to an identification module contained in a communication terminal device, comprising the following steps: (i) a request that was sent by an application of the communication terminal device instructing that the verification request should be transmitted to the identification module is received in a transmission means that is arranged physically separate from the communication terminal device, (ii) the verification request is transmitted by the transmission means to the identification module of the communication terminal device, (iii) a verification response to the verification request ascertained in the identification module is received in the transmission means, and (iv) a notification about the received verification response is transmitted by the transmission means to the application of the communication terminal devices.

15 Claims, 2 Drawing Sheets

(56) References Cited

U.S. PATENT DOCUMENTS

2013/0031642 A1* 1/2013 Dwivedi ................ G06F 21/10
726/29

* cited by examiner

METHOD AND DEVICE FOR TRANSMITTING A VERIFICATION REQUEST TO AN IDENTIFICATION MODULE

RELATED APPLICATION

This application claims the benefit of German Patent Application Serial No. DE 102012210343.0, filed on Jun. 19, 2012, the disclosure of which is entirely incorporated herein by reference.

TECHNICAL FIELD

The invention relates to the use of an identification module in a communication terminal device. In particular, the invention relates to a method for transmitting a verification request to an identification module contained in a communication terminal device, and it also relates to a device that is suitable for carrying out the method.

BACKGROUND ART

Communication terminal devices that are provided for access to a cellular network normally contain an identification module that is personalized for the user of the terminal device and that provides, among other things, data and/or processes for subscriber identification and/or authentication. Examples of such identification modules are SIM (Subscriber Identity Module) and USIM (Universal Subscriber Identity Module) cards of the type used in GSM (Global System for Mobile Communications), UMTS (Universal Mobile Telecommunications System) and LTE (Long Term Evolution) networks. The subscriber identification and/or authentication is generally carried out at the time of logging on to a cellular network in order to determine the authorization to access cellular services, and this involves executing cryptographic operations within the identification module which are carried out using cryptographic keys that are stored in the identification module.

Fundamentally, cryptographic operations can also be carried out for purposes other than for subscriber identification and authentication in an identification module that is installed in a communication terminal device. In particular, verification requests from applications that are executed in the communication terminal device can be responded to by the identification module of the communication terminal device. These can be, for example, verification requests for user authentication on the part of the application. Thus, on the basis of a given verification request, which is responded to by means of the secret keys associated with the identification module, it is possible to determine whether the identification module of an authorized user of the application has been installed in the communication terminal device.

In order to transmit verification requests from an application to an identification module and to transmit the verification response of the identification module to the application, there is a need for communication between the application and the identification module. With some communication terminal devices, a device-internal data exchange can be carried out between the application and the identification module via a corresponding device-internal interface that permits access to the identification module. However, by the same token, there are communication terminal devices in which such interfaces are not present or are blocked due to security guidelines implemented in the devices.

DISCLOSURE OF THE INVENTION

It is an objective of the present invention to make it possible for an identification module to respond to verification requests from applications, also in such communication terminal devices.

This objective is achieved by a method according to claim 1 and by a device according to claim 13 as well as by a application according to claim 14. Embodiments of the method and of the device as well as of the application are put forward in the dependent claims.

According to a first aspect of the invention, a method is put forward for transmitting a verification request to an identification module contained in a communication terminal device. The method comprises the following steps: a request that was sent by an application of the communication terminal device instructing that the verification request should be transmitted to the identification module is received in a transmission means that is arranged physically separate from the communication terminal device, the verification request is transmitted by the transmission means to the identification module of the communication terminal device in response to the request, a verification response to the verification request ascertained in the identification module is received in the transmission means, and a notification about the received verification response is transmitted by the transmission means to the application of the communication terminal devices.

According to another aspect, the invention proposes a device for connection to a communication terminal device that is physically separate from it and that contains an identification module which is configured to respond to a verification request. For this purpose, the device is configured to receive a request sent by an application of the communication terminal device instructing that the verification request should be transmitted to the identification module of the communication terminal device, the device is configured to transmit the verification request to the identification module in response to the request, the device is configured to receive a verification response to the verification request, wherein the verification response was determined in the identification module, and the device is configured to transmit a notification about the received verification response to the application of the communication terminal device. The invention comprises the idea that the verification request is transmitted by a transmission means to the identification module of the communication terminal device on the basis of a request to this effect made by the application, and then the application of the transmission means is informed about the verification response.

Moreover, according to another aspect, the invention proposes an application for use in a communication terminal device containing an identification module. The application is configured to transmit a request that a verification request to the identification module should be transmitted to a transmission means that is arranged physically separate from the communication terminal device, and the application is configured to receive from the transmission means a notification about the verification response of the identification module. In particular, the application is a computer program that can be executed in the communication terminal device.

The transmission means is an external means that is arranged physically separate from the communication terminal device. In this manner, it is then also possible to transmit the verification request to the identification module and to inform the application about the verification response if a device-internal transfer of the verification request and of the verification response is not possible.

The connection of the communication terminal device or the application and the identification module to the transmission means can be made via a communication network. In particular, the transmission means can be a constituent of a cellular network to which the communication terminal device can be connected. In this case, the communication between the communication terminal device and the transmission means can be made wirelessly via the cellular network.

In one embodiment of the method and of the device, the verification request comprises an encrypted response key that can only be decrypted with a secret cryptographic key that is stored in the identification module. In a related embodiment of the method and of the device, the verification response contains the response key that is decrypted in the identification module by means of the cryptographic key. In these embodiments, on the basis of the verification request and of the verification response that is then transmitted by the identification module, it is ascertained whether a specific identification module that has the cryptographic key has been installed in the communication terminal device. The identification module and the key can be, for instance, associated with a specific user who is authorized to access the application or the protected function of the application.

The response key is preferably generated by means of a random algorithm or a pseudo-random algorithm. Moreover, the response key is preferably used only for one verification request. These measures increase the security against manipulation with response keys discovered by unauthorized third parties.

Another embodiment of the method and of the device is characterized in that the identification module generates the verification response and/or decrypts the response key after the identification module has successfully performed a user authentication. In one embodiment of the method and of the device, the user authentication comprises the verification of an authentication feature entered into the communication terminal device by the user. The authentication feature can especially be a personal identification number (PIN). Such a user authentication can ensure not only that the identification module of the authorized user has been installed in the communication terminal device, but also that the communication terminal device is currently being used by the authorized user.

One embodiment of the method and of the device provides that the verification request is sent by the transmission means to the identification module in an over-the-air (OTA) message. OTA mechanisms are generally known and allow secured remote access to identification modules. Advantageously, such an OTA mechanism can be used here to securely transmit the verification request to the identification module. Moreover, one embodiment of the method and of the device provides that the response key is sent by the identification module to the transmission means without being encrypted. The transmission of the verification request can be simplified by dispensing with the encryption. Owing to the random nature of the response key and to its one-time use, sufficient security is ensured, even when an encryption is dispensed with.

In another embodiment of the method and of the device, in response to an attempt by a user of the communication terminal device to access a protected function of the application, the application sends to the transmission means the request for the transmission of the verification request to the identification module. In particular, with this embodiment, a user authentication for access to the protected function of the application can be undertaken by means of the verification request. Another embodiment of the method and of the device is characterized in that the application enables access to the protected function depending on the notification about the received verification response. Here, the application can enable, for instance, access to the protected function if a successful user authentication has been ascertained on the basis of the verification response. The application can especially allow the establishment of a secure communication connection, especially of a voice and/or video call, to a communication partner, whereby the establishment of the communication connection is enabled depending on the notification about the received verification response. In particular, the communication can be enabled after a successful user authentication on the basis of the verification request which is ascertained on the basis of the verification response.

Moreover, one embodiment of the method and of the device is characterized in that the encrypted response key contained in the verification request is generated by the application of the communication terminal device. A related embodiment of the method and of the device provides that the response key contained in the verification response is forwarded to the application by the transmission means. These embodiments allow the application itself to perform the verification that was undertaken on the basis of the verification request and that, as described above, can especially be a user authentication. By the same token, however, it can also be provided that the verification request and especially the response key are generated in the transmission means on the basis of the request by the application, and that the transmission means evaluates the verification response and especially a response key contained therein, and then reports to the application the result of the evaluation in the notification.

In addition to the application described here, a communication terminal device is provided that comprises the application as well as an identification module. Moreover, a system is provided that comprises a device of the type described here as well as the communication terminal device. In the system, the device, as already mentioned above, can be connected to the communication terminal device via a communication network. In particular, the device can be arranged in a cellular network. In this case, a data exchange between said device and the communication terminal device can take place via the cellular network.

The above-mentioned and additional advantages, special features and practical refinements of the invention are also explained on the basis of the embodiments, which will be described below with reference to the figures.

BEST MODE FOR CARRYING OUT THE INVENTION

Figure 1:
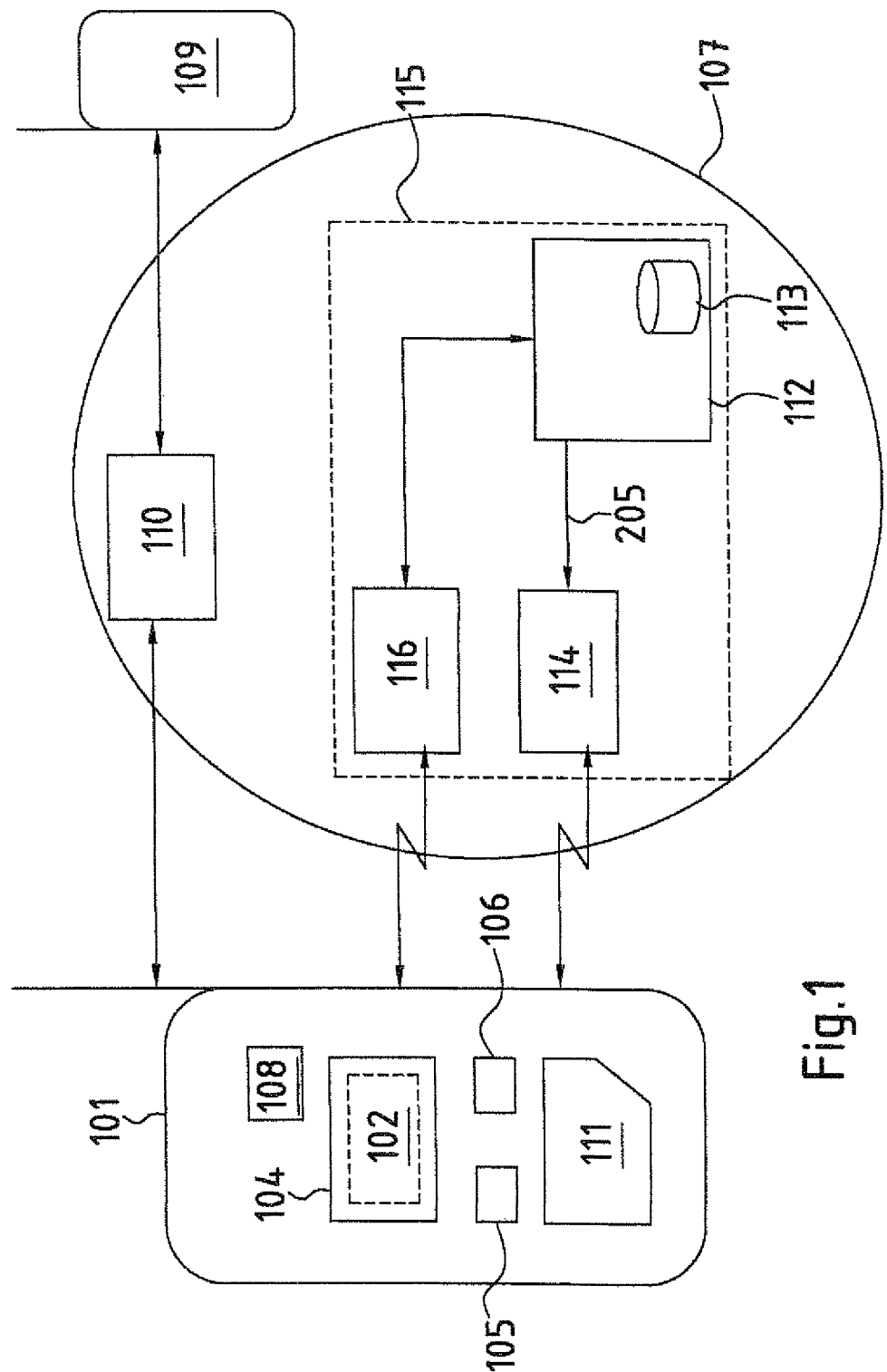
FIG. 1 a schematic view of a communication terminal device and of components of a cellular network for transmitting a verification request to the identification module of the terminal device, and FIG. 2 a schematic illustration of steps to send a verification request to the identification module of the terminal device and to report the verification result to an application of the terminal device.

The communication terminal device 101 shown in FIG. 1 has an application 102 that accesses cryptographic functions of an identification module 111 that has been installed in the communication terminal device. In an embodiment shown by way of an example, the application 102 is a program for secure communication by the user of the communication terminal device 101 with a communication partner 109. The communication can take place via voice and/or video transmissions that are established, for example, using a packet-switching data service as VoIP (Voice over IP) connections, or via electronic message transmission, especially via e-mail. Cryptographic processes that are carried out in the identification module 111 can be used in the application 102 for user authentication. In particular, it can be ensured that the identification module 111 of the authorized user has been installed in the communication terminal device 101 and that the application 102 executed in the communication terminal device 101 is thus being used by the authorized user himself or herself and not by an unauthorized third party. By the same token, other accesses by the application to cryptographic functions of the communication terminal device 101 can be provided.

The terminal device 101 is configured as an electronic data processing device that can be used by the user especially for communication with the communication partner. The terminal device 101 can be configured to be mobile. Here, it can be, for example, a cellular phone, a smartphone, a tablet or notebook computer or the like. By the same token, the terminal device 101 can be configured as a stationary communication terminal device such as, for example, a personal computer (PC).

In the embodiment shown, the terminal device 101 comprises a terminal 103 with a processor unit 104 containing one or more processors. The processor unit 104 serves to execute programs that control the communication terminal device 101. Moreover, the application 102 that accesses the cryptographic functions of the identification module 111 is executed in the processor unit 104. Moreover, additional applications can be executed in the processor unit 104. The processor unit 104 is connected to a memory unit 105 which stores the software codes of the control functions and applications that can be executed in the processor unit 104 as well as the useful data used by the applications. Moreover, the terminal 103 comprises a user interface 106 that is coupled to the processor unit 104 and that comprises means for interaction between the terminal device 101 and its user. In particular, the user interface 106 can have a visual output means configured as a display as well as one or more input means such as, for example, a keyboard and/or a joystick. The display can also be configured as a so-called touchscreen and can thus serve as a visual output means and also as an input means. Moreover, the user interface 106 can provide additional input and output means such as, for instance, a loudspeaker and a microphone for the input and output of audio signals.

The communication terminal device 101 can be connected wirelessly to a cellular network 107 via an access network (not shown in the figure) in order to utilize cellular services provided by the cellular network 107 such as, for example, services for voice and message transmission. In order to connect to the cellular network 107, the terminal 103 of the terminal device 101 provides a radio module 108 that has the requisite radio technology to connect to the access network such as, for example, an antenna with the appertaining components. As shown in FIG. 1 by way of an example, data can be exchanged between the terminal device 101 and the communication partner 109 via the cellular network 107 making use of a communication service provided by the cellular network 107. Here, the data can be exchanged, for instance, via a network node 110 of the cellular network associated with the communication service. By the same token, however, the terminal device 101 can also be equipped for connection to an additional communication network (not shown in the figure), and the data exchange with the communication partner 109 can be handled via the additional communication network. Examples of additional communication networks to which the terminal device 101 can be connected are WLAN (Wireless Local Area Networks) and hard-wired communication networks.

An identification module 111 is installed in the terminal 103 for use during the operation of the terminal device 101 in the cellular network 107. In particular, the identification module 111 provides data and processes that are needed for the terminal device 101 to access the cellular network 107. Among other things, data and processes provided by the identification module 111 for subscriber identification and authentication are used in the cellular network 107. The subscriber identification and authentication is normally undertaken at the time of logging on to the cellular network 107, and it comprises the identification of the identification module 111 on the basis of an identifier that is sent by the identification module 111 to the cellular network 107, and it also comprises the authentication of the identification module 111 on the basis of information that is computed in the identification module 111 using prescribed algorithms and data stored in the identification module 111. The computation can comprise a cryptographic processing of information that is sent by the cellular network 107 and whose result is sent back to the cellular network 107 as the response to the verification. The identification module 111 has a special security architecture that prevents unauthorized access to data and processes, especially to the above-mentioned data and processes used on the cellular network 107 for subscriber identification and authentication.

For access to the data and functions of the identification module 111, the identification module 111 undertakes a user authentication. This can especially be done in that the user—in response to a prompt to this effect—enters an authentication feature at the user interface 106 of the communication terminal device 101, and this authentication feature is relayed within the communication terminal device 101 to the installed identification module 111, where it is then verified. Only after successful verification of the authentication feature is the access to the data and functions of the authentication module enabled, whereby the verification is considered to be successful if the entered authentication feature matches a corresponding authentication module stored in the identification module 111. The authentication feature can be, for example, a personal identification number (PIN) of the user. The entry and verification of the authentication feature are preferably already carried out shortly after the communication terminal device 101 is switched on, so that the functions of the identification module 111 are available right away after the device is switched on. In the terminal device 101 shown in FIG. 1, the application 102 also uses cryptographic functions of the identification module 111. In order to execute the cryptographic functions triggered by the applications 102, at least one secret cryptographic key is stored in the identification module 111. The cryptographic key is securely stored in the identification module 111. In this context, it is preferably ensured that the key does not leave the identification module 111, even in conjunction with the execution of cryptographic operations. In particular, one embodiment comprises that the secret key stored in the identification module is a constituent of an asymmetrical key pair that is associated with the user of the communication terminal device 101 and with the application 102. In this embodiment, a public key of the user that is associated with the secret key is stored in the application 102.

In one embodiment, the cryptographic key is used to respond to a verification request that is transmitted to the identification module 111 in response to a request by the application 102. Based on the cryptographic key, the identification module 111 ascertains the response to the verification request and sends the verification response back, whereby the verification response is reported to the application 102. The verification request contains a preferably randomly or pseudo-randomly generated response key that is encrypted with the public key of the user stored in the identification module 111. In the identification module 111, the response key is decrypted by means of the secret key stored in the identification module 111 and sent back in the verification response. The key contained in the verification response is compared to the previously encrypted, and then at least temporarily stored, response key. If the received response key matches the stored response key, then the user authentication is considered to have been successful.

After a successful user authentication, the application can grant the user of the communication terminal device 101 access to the application 102 or to protected functions of the application 102. If, as described above, this is an application 102 for secure communication with a communication partner, then it can be provided, for instance, that after the successful user authentication, the communication with the communication partner is activated.

In one embodiment, the identification module 111 is a secured chip contained in a chip card that can be temporarily inserted into a card reader of the terminal 103. In this embodiment, the identification module 111 can be a SIM or USIM card that is used for access to a cellular network 107 that can be configured as a GSM, UMTS or LTE network. By the same token, however, the identification module 111 can also be a chip that is permanently installed in the terminal device 101. In this embodiment as well, the chip can be configured as a SIM or USIM chip. In another embodiment, the identification module 111 is a specially secured software module that is implemented in the processor unit 104 of the terminal 103.

The identification module 111 is registered in a cellular network 107 that is also referred to as the home network of the identification module 111 or of the user of the terminal device 101, and which is shown in FIG. 1. The operator of the home network or an agent acting on its behalf issues the identification module 111 to the user after it has first been preconfigured in a secure process. In this process, data that is prescribed by the operator of the home network and that is used for the identification and authentication of the identification module 111, processes prescribed by the operator such as, for example, encryption algorithms used during the authentication, as well as other data prescribed by the operator are all installed in the identification module 111. The validation information can likewise be stored in the identification module already during the preconfiguration. As an alternative, however, installation at a later point in time is likewise possible.

After the identification module 111 has been issued, in one embodiment, the identification modules 111 registered in the cellular network 107 can be remotely accessed so that modifications can be carried out. For example, data and processes or programs can be changed, augmented or deleted in an identification module 111. By means of the remote access, such modifications can be made without the identification modules 111 having to be modified at a service point of the cellular service provider or of another service provider or without having to be reissued.

For the remote access to an identification module 111, an OTA mechanism can be used in which an OTA server 112 sends a message to the identification module 111 in question, which can contain data for installation into the identification module 111 and/or commands for changing data or for executing processes and programs in the identification module 111. The OTA server 112 can be arranged in the cellular network 107 as shown in FIG. 1, and can be operated, for instance, by the appertaining cellular service provider, or else it can be operated by a reliable organization outside of the cellular network 107. An example of an OTA mechanism for remote access to chip cards that can be used in this context has been specified by the European Telecommunications Standards Institute (ETSI) and by the $3^{rd}$ Generation Partnership Project (3GPP) in the standard documents GSM 03.48, TS 23.048 as well as TS 102 225, TS 102 226, TS 31.114 and TS 31.115.

Cryptographic mechanisms are used in order to secure the remote access to the identification modules 111 and, above all, in order to protect against unauthorized access to the identification modules 111. The messages sent by the OTA server 112 to an identification module 111, which will be referred to below as OTA messages, are encrypted with a cryptographic key in order to protect them from unauthorized manipulation along the transmission route, and in order to prevent unauthorized parties from being able to send OTA messages to an identification module 111. The key is preferably unambiguously associated with the appertaining identification module 111 and stored under an identifier of the identification module 111 in a database 113 of the OTA server 112. The identifiers can also be the MSISDNs (Mobile Subscriber Integrated Services Digital Network Number) that also serve as the phone numbers of the identification modules 111 and that are associated with the identification modules 111. In addition or as an alternative, the identifier can also comprise other identification codes associated with the identification module. Received OTA messages are decrypted with a matching cryptographic key in the identification module 111. Moreover, the authenticity of the messages is verified in the identification modules 111. The key used in the OTA server 112 for the encryption and the key used in the identification module 111 for the decryption, which are also referred to below as OTA keys, can form a symmetrical key pair. By the same token, however, the use of asymmetrical key pairs can also be provided for. The OTA key used in the identification module 111 can have been stored in the identification module 111 during the above-mentioned preconfiguration.

The OTA messages are transmitted via a data transmission service provided in the cellular network 107. In particular, a text message service can be used which, in one embodiment, is the generally known SMS (Short Message Service). In the case of an SMS, text messages are sent by a SMSC (Short Message Service Center) 114 of the cellular network 107 to the communication terminal devices 101 connected to the cellular network 107. Therefore, for purposes of transmitting OTA messages, the OTA server 112 has an SMS interface via which it is connected to the SMSC 114. In order to transmit an OTA message to an identification module 111, the OTA server 112 transfers the encrypted content of the OTA message, together with the phone number (MSISDN) associated with the identification module 111, to the SMSC 114 via the SMS interface. The SMSC 114 then sends an OTA message configured as an SMS message to the communication terminal device 101 in question, making use of the phone number associated with the identification module 111. This is done fundamentally in the same manner as the transmission of other SMS messages to the communication terminal device 101. However, the OTA message is forwarded by the terminal 103 to the identification module 111 on the basis of a special identifier it contains. This is preferably done non-transparently, that is to say, invisibly to the user of the terminal device 101. In the identification module 111, the message is first decrypted after being received and, as described above, it is authenticated in this process. After the successful decryption, the message is evaluated and control commands contained in it are carried out.

In the cellular network 107 illustrated in FIG. 1, the OTA server 112 and the SMSC 114 are constituents of a transmission means 115 that is used to send the verification request to the identification module 111 and to report to the application 102 the verification response ascertained in the identification module 111. The transmission means 115 also contains a communication server 116 that can likewise be arranged in the cellular network 107. The communication server 116 is capable of exchanging data with the application 102 of the terminal device 101. The data is exchanged via a communication service provided by the cellular network 107. In one embodiment, a packet-switched or line-switched data connection between the terminal device 101 and the communication server 116 is established via the cellular network 107, whereby messages between the application 102 and the communication server 116 can be exchanged via these data connections. As an alternative, it can be provided to use a message service of the cellular network 107, such as, for example, SMS or MMS (Multimedia Messaging Service), for the exchange of messages.

In order to carry out the data exchange with the communication server 116, the application 102 is preferably configured to access interfaces that are provided by the terminal device 101 and that allow the automatic use of a data connection to the cellular network 107, or the transmission as well as the receipt of messages via a message service provided by the cellular network 107. Via such an interface, in one embodiment, the communication between the application 102 and the communication server 116 is implemented non-transparently for the user of the terminal device 101. Here, preferably no information is displayed to the user about the transmission of individual messages and their content. However, it can be provided that the user of the application 102 is informed that a data exchange is taking place via the cellular network 107.

The use of the transmission means 115, which is separate from the terminal device 101, in order to transmit the verification request to the identification module 111 makes it possible to also send the verification request to the identification module 111 in those terminal devices 101 that do not permit such a direct communication between the application 102 and the identification module 111 via a device-internal interface.

Figure 2:
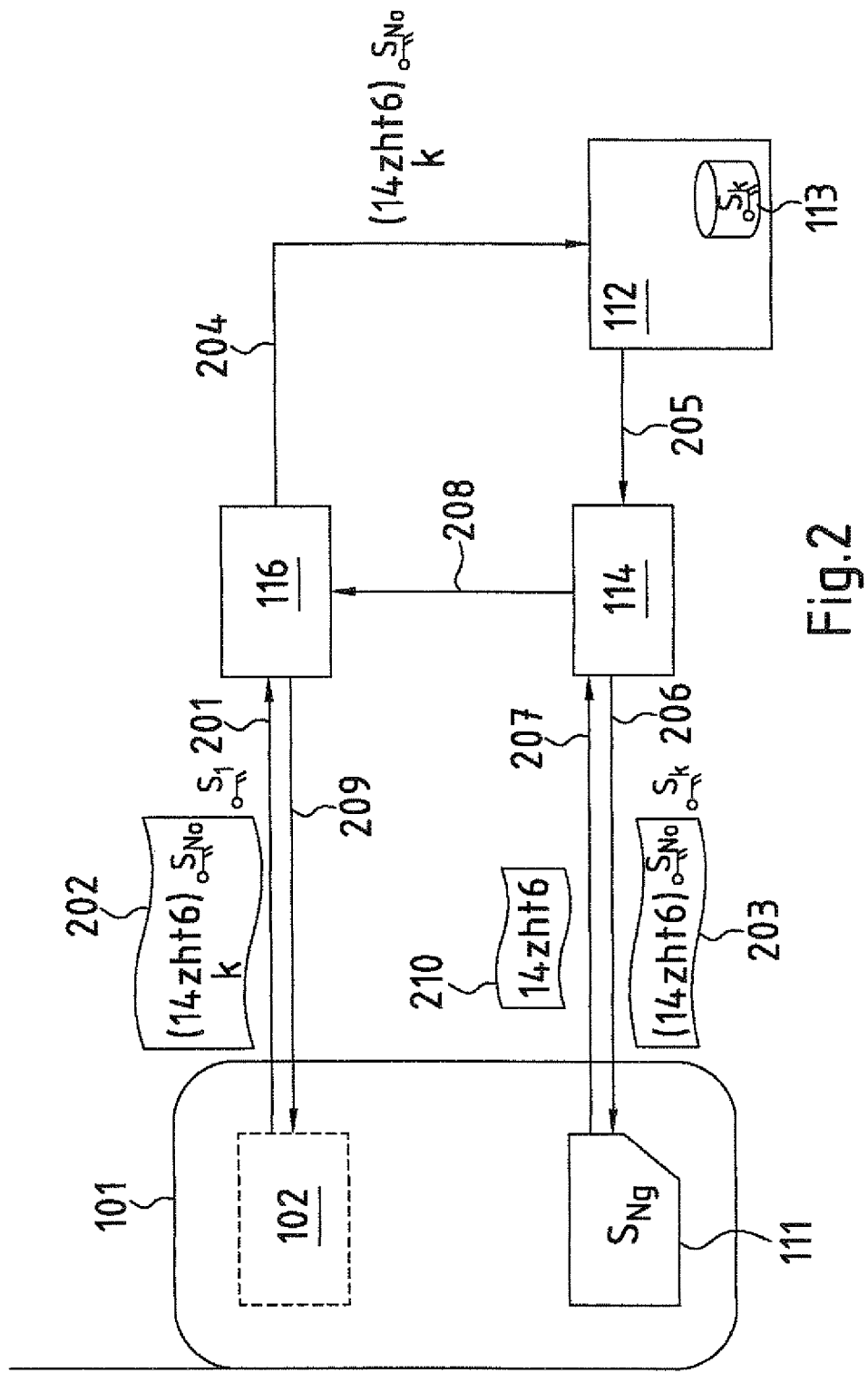

Making reference to the schematic illustration of FIG. 2, steps are now described by way of an example that can be carried out in one embodiment in order to generate, transmit and respond to the verification request in conjunction with the terminal device 101 shown in FIG. 1 and with the transmission unit 115 of the cellular network 107.

First of all, in Step 201, the application transmits a request message 202 to the communication server 116 of the transmission means 115. The request message 202 is generated and sent, for example, on the basis of an attempt by the user of the communication terminal device to access the application or a protected function of the application. In particular, the request message 202 can be sent by the user by starting the application. If the application is a routine for secure communication with a communication partner, then the request message 202 can then be sent, for example, when the user would like to establish a communication connection to a communication partner or when he/she would like to accept an incoming communication connection.

In one embodiment, the request message already contains the verification request and instructions to transmit the verification request to the identification module 111 as well as an identifier K of the terminal device 101 or of the installed identification module 111. The identifier K can be, for example, the MSISDN associated with the identification module 111. In one embodiment, the verification request contained in the request message 202 is generated by means of a response key which can especially be a randomly or pseudo-randomly generated character string. As explained above, the response key is encrypted with the public key SNo of a key pair associated with the identification module 111 in order to generate the verification request.

Aside from the public key SNo, the key pair comprises the secret key SNg that is stored in the identification module 111. In the example shown in FIG. 2, the response key is 14zht6.

In an alternative embodiment (not shown in FIG. 2), the verification request is not contained in the request message 202 but rather is generated in the communication server 116. In this embodiment, the request message 202 contains not only the identifier K of the identification module 111 but also instructions to generate the verification request and to transmit the verification request to the identification module 111. The verification request is generated after the request message 202 has been received in the communication server 116 in the same manner as described above.

The communication between the application 102 and the communication server 116 can be secured against manipulation, for example, in order to prevent the request message 202 from being changed along the transmission route. In one embodiment, securing against unauthorized access is optionally done by encrypting the request message 202 with a cryptographic key S1 that is a constituent of a symmetrical or asymmetrical crypto-system established between the application 102 and the communication server 116.

When the communication server 116 receives the request message 202, the communication server 116 performs an evaluation of the request message 202, and in this process, it reads out the verification request or the instructions to generate the verification request as well as the identifier K of the identification module 111 from the request message 202. If an encryption of the request message 202 is provided for, then the communication server 116 uses the decryption key that is associated with the key S1 used for the encryption and that is stored in the communication server 116 in order to decrypt the message 202 before the evaluation.

On the basis of the evaluation of the received request message 202, the communication server 116 prepares the transmission of an OTA message 203 to the identification module 111 of the terminal device. The content of the OTA message 203 comprises the verification request that contains the encrypted response key and that was taken over from the request message 202 or that was generated in the communication server 116 in response to the request message 202, and it also comprises instructions directed to the identification module 111 calling for a response to the verification request. In Step 204, the verification request, together with the identifier K of the identification module 111, is transferred by the communication server 116 to the OTA server 112. The communication between the communication server 116 and the OTA server 112 takes place within the cellular network 107 and is secured in a suitable manner against unauthorized manipulation. On the basis of the received identifier K, the OTA server 112 ascertains the OTA key SK belonging to the identification module 111, and then generates the OTA message 203 that has been encrypted with the OTA key SK and that contains the verification request transferred by the communication server 116. The OTA message 203 is then transmitted to the terminal device 101. In the configuration shown and described above, this is done by means of the SMS in that the OTA message 203 is first transferred to the SMSC 114 in Step 205, and subsequently sent by the SMSC 114 to the terminal device 101 in Step 206.

In the terminal device 101, the OTA message 203 is transferred to the identification module 111 which decrypts the OTA message 203 with the OTA key that is stored in the identification module 111 and that is associated with the key SK and, after the decryption, the OTA message is further processed. Here, the identification module 111 recognizes the instructions to respond to the verification request and then performs the cryptographic operations in order to respond to the verification request. These operations comprise using the cryptographic key SNg that is stored in the identification module 111 in order to decrypt the response key contained in the verification request. After the successful decryption, the identification module 111 incorporates the decrypted response key into the verification response 210 that is transferred by the identification module 111 to the terminal 103 of the terminal device 101 and that is then transmitted by the terminal device 101 to the communication server 116. In the embodiment shown in FIG. 2, this is done by means of the SMS in which the verification response is first sent in an SMS message to the SMSC 114 in Step 207, and then transferred from the SMSC 114 to the communication server 116 in Step 208. If the response key cannot be decrypted in the identification module 111, it can be provided that the identification module 111 transmits an error message as the verification response to the communication server 116.

In one embodiment, the communication server 116 forwards the verification response with the decrypted response key to the application 102 of the terminal device 101. In order to prevent manipulation of the indication of the verification result along the transmission route between the communication server 116 and the terminal device 101, the response message 209 can optionally be protected by means of the crypto-system that has been established between the communication server 116 and the application 102. The optional encryption of the verification response carried out for this purpose is illustrated in FIG. 2 on the basis of the indication of the key S1.

The application 102 reads the response key out of the received report of the communication server and compares it to the response key that was previously used for generating the verification request and that is at least temporarily stored in the application 102 for purposes of the comparison. If the received response key matches the stored response key, then the application determines that the user authentication has been successfully completed. On the basis of this determination, as described above, any protected functions can be enabled so that the user of the communication terminal device 101 can access them.

If the verification request is not generated by the application 102 but rather by the communication server 116, the verification of the response key contained in the verification response 210 of the identification module 111 is carried out in the communication server 116. The verification is carried out in the same manner as described above, in that the communication server 116 compares the response key contained in the response notification 210 to the response key that was used for generating the verification request and that is stored in the communication server 116. If the verification is successful, that is to say, if both response keys match, then the successful response to the verification request by the identification module 111 is reported to the application 102 within the response message 209 from the communication server 116. A manipulation of this report can be prevented by encrypting the response message as described above.

The response key decrypted in the identification module 111 can fundamentally be sent to the communication server 116 without being encrypted and, if applicable, it can be forwarded by the communication server 116 to the application 102 without being encrypted. Since, as a rule, identification modules 111 cannot use their OTA keys to encrypt outgoing messages so as to increase the security, the creation of another crypto-system would be necessary to encrypt the response notification 210 sent by the identification module 111. This can be dispensed with if the encryption of the response key or of the response message 209 is dispensed with. In order to prevent manipulation using read-out keys, each response key is preferably used only once, that is to say, for one authentication procedure. Thus, it is a so-called session key. In this manner, a response key that has been read out by an attacker from a response notification 210 of the identification module 111 cannot be used with fraudulent intent as a valid response key in another response notification 210.

In addition, it can be provided that a period of validity is associated with the response key. On the one hand, the period of validity is selected in such a way that sufficient time is available to transmit the OTA message 203 to the identification module 111, to decrypt the response key contained in the verification request, and to transmit the response notification 210 to the communication server 116 as well as, if applicable, to transmit the response message 209 to the application 102. On the other hand, the period of validity is selected so as not to be too long. When the response key is received in the application 102 or in the communication server 116 for purposes of verification, then the application 102 or the communication server 116 verifies whether the period of validity of the contained response key has expired or not. For this purpose, in one embodiment, the application 102 or the communication server 116 generates a time stamp at the time when the verification request is generated, and this time stamp is stored in conjunction with the response key contained therein. When the response key is being verified, the time of receipt of the response key is compared to the time stamp in order to check whether the response key was received within the period of validity. If this is the case, the configuration of the response key continues. In contrast, if it is ascertained that the period of validity has expired, then the response key is declared to be invalid and an error routine is started.

In the previous embodiment, the verification request is responded to by the identification module without further interaction between the identification module 111 and the user of the communication terminal device 101. The response to the verification request is made after the functions of the identification module 111 have been activated in that the user has entered his/her authentication feature as described above and in that the authentication feature has been successfully verified. Thus, there is a high level of certainty that the application 102 is being used by the authorized user.

In the embodiment described above, the user authentication is carried out in that, on the basis of the verification request, it is ascertained whether the identification module 111 associated with the user has been installed in the communication terminal device 101. In another embodiment, the identification module 111 performs another user authentication on the basis of the receipt of the verification request. In this embodiment, on the basis of the receipt of the verification request, the user is prompted by the identification module 111 to enter an authentication feature at the user interface 106. This authentication feature is verified by the identification module 111 and only after a successful verification of the authentication feature is the decryption of the encrypted response key that is contained in the verification request carried out. If the verification of the authentication feature cannot be carried out successfully, then the identification module 111 can generate an error report and can send it to the communication server 116. The authentication feature for activating the response to the verification request can match the authentication feature for activating the identification module 111 already described above. In order to activate the response to the verification request, however, it is also possible for another authentication feature to be provided for which can be, for instance, another PIN.

Particularly when the identification module 111 responds to the verification request only after an additional user authentication, it can be provided that each verification request contains a response key for the possible results of the user authentication by the identification module 111. In particular, a response key can be contained that is associated with a successful user authentication as well as another response key that is associated with a failed user authentication. As in the embodiment described above with a response key contained in the verification request, the response keys are encrypted during the generation and decrypted in the identification module 111 after the verification request has been transmitted to the identification module 111.

In one embodiment, the response keys are configured as alphanumerical character strings that have a sufficient length to rule out manipulation with sufficient probability. In order to rule out a decipherable relation between the two response keys for the possible verification results, the character strings can be generated randomly or by means of a pseudo-random algorithm in the communication server 116.

After the identification module 111 has read out the response keys from the OTA message 203 and has performed the user authentication on the basis of the authentication feature, the identification module 111 selects the response key that corresponds to the result of the authentication and incorporates the selected response key into the verification request 210 which is then transmitted to the communication server 116 in the manner already described in Steps 207 and 208. If applicable, the communication server 116 forwards the verification request to the application 102.

When the unit that has generated the verification request (the application 102 or the communication server 116) receives a verification response 210 with a response key, it reads the response key out of the response notification 210 and ascertains the authentication result that is associated with the response key. For this purpose, the response keys and information about the associated authentication results are stored in the unit in question after the response keys have been generated. If the unit is the communication server 116, it reports the authentication result to the application 102.

After the application 102 has ascertained the authentication result or has received the report about the authentication result from the communication server 116, the application can enable access to its protected functions, depending on the authentication result.

Although the invention has been described in detail in the drawings and in the presentation given above, the presentations are merely illustrative and provided by way of example, and should not be construed in a limiting manner. In particular, the invention is not limited to the explained embodiments. The person skilled in the art can glean additional variants of the invention and their execution from the preceding disclosure, from the figures and from the patent claims.

In the patent claims, terms such as "encompass", "comprise", "contain", "have" and the like do not exclude additional elements or steps. The use of the indefinite article does not preclude the plural. Each individual device can execute the functions of several of the units or devices cited in the patent claims. The reference numerals indicated in the patent claims are not to be construed as a limitation of the means and steps employed.

REFERENCE NUMERALS 101 communication terminal device
102 application
103 terminal
104 processor unit
105 memory unit
106 user interface
107 cellular network
108 radio module
109 communication partner
110 network node
111 identification module
112 OTA server
113 database of the OTA server
114 SMSC (Short Message Service Center)
115 transmission means
116 communication server
201, 204-209, 211 steps
202 request message
203 OTA message
210 verification response

The invention claimed is:

1. A method for enabling access to a protected function of an application installed in a communication terminal device by means of an identification module contained in the communication terminal device, the method comprising the following steps:
    generating, by the identification module, a response key, wherein the application is prevented from communicating with the identification module by means of an internal data exchange of the communication terminal device;

receiving in a transmission means that is arranged physically separate from the communication terminal device a request that was sent by an application of the communication terminal device instructing that the verification request should be transmitted to the identification module, the request being related to the access to the protected function of the application;

transmitting the verification request by the transmission means to the identification module of the communication terminal device in response to the request, wherein the verification request comprises the response key;

determining based on the verification request a verification response by means of the identification module, wherein the verification response comprises the response key;

receiving the verification response in the transmission means, transmitting a notification about the received verification response by the transmission means to the application of the communication terminal device;

verifying the response key; and controlling, by the application, access to the protected function of the application based on a result of the verification of the response key.

2. The method according to claim 1, wherein the method comprises the additional step of:

encrypting the response key such that the verification request comprises the encrypted response key, wherein the encrypted response key-can only be decrypted with a secret cryptographic key that is stored in the identification module.

3. The method according to claim 2, wherein the verification response contains the response key that is decrypted in the identification module by means of the cryptographic key.

4. The method according to claim 1, wherein the identification module generates the verification response and/or decrypts the response key after the identification module has successfully performed a user authentication.

5. The method according to claim 4, wherein the user authentication comprises the verification of an authentication feature, especially a personal identification number, entered into the communication terminal device by the user.

6. The method according to claim 1, wherein, in response to an attempt by a user of the communication terminal device to access the protected function of the application, the application sends to the transmission means the request for the transmission of the verification request to the identification module.

7. The method according to claim 1, wherein the application enables access to the protected function depending on the notification about the received verification response.

8. The method according to claim 1, wherein the application allows the establishment of a secure communication connection, especially of a voice and/or video call, to a communication partner, whereby the establishment of the communication connection is enabled depending on the notification about the received verification response.

9. The method according to claim 2, wherein the encrypted response key contained in the verification request is generated by the application.

10. The method according to claim 9, wherein the response key contained in the verification response is forwarded to the application by the transmission means.

11. The method according to claim 1, wherein the communication terminal device and/or the identification module are connected to the transmission means via a communication network, especially via a cellular network.

12. The method according to claim 1, wherein the application is implemented in a terminal of the communication terminal device, and whereby the terminal is connected to the identification module via an interface.

13. A device for enabling access to a protected function of an application installed in a communication terminal device via an identification module, whereby the device is configured:

to receive a request sent by the application of the communication terminal device instructing that a verification request should be transmitted to the identification module of the communication terminal device, the request being related to the access to the protected function of the application, wherein the application is prevented from communicating with the identification module by means of an internal data exchange of the communication terminal device;

to transmit the verification request to the identification module in response to the request;

to receive a verification response from the identification module comprising the response key to the verification request wherein the response key is generated by the identification module;

to verify the response key; and to transmit a notification about the verification to the application of the communication terminal device for authentication of a protected function of the application.

14. A communication terminal device, comprising:

an identification module embodied on a chip;

a processor unit comprising one or more processors physically separate from the identification module;

a memory unit storing a radio module and an application;

wherein the application is prevented from communicating with the identification module by means of an internal data exchange of the communication terminal device;

wherein the application is configured to transmit a request that a verification request to the identification module should be transmitted to a transmission means that is arranged physically separate from the communication terminal device, the request being related to the access to the protected function of the application, the verification request comprising a response key generated by the identification module, the identification module being configured to determine a verification response based on the verification request, wherein the verification response comprises the response key, the application is configured to receive from the transmission means a notification about the verification response of the identification module, and the application is further configured to enable access to the protected function of the application based on a result of the verification response.

15. A system comprising a device according to claim 13 and further comprising the communication terminal device comprising a processor unit comprising one or more processors, a memory unit, a radio module, an identification module embodied on a chip and an application stored in the memory unit, wherein the processor unit being separated from the identification module.

* * * * *